United States Patent
Nagai et al.

(10) Patent No.: US 10,967,901 B2
(45) Date of Patent: Apr. 6, 2021

(54) GAP CONCEALING STRUCTURE FOR VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Yasuyuki Nagai, Kariya (JP); Atsushi Yamaguchi, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 16/297,103

(22) Filed: Mar. 8, 2019

(65) Prior Publication Data
US 2019/0283794 A1 Sep. 19, 2019

(30) Foreign Application Priority Data
Mar. 13, 2018 (JP) .............................. JP2018-045760

(51) Int. Cl.
*B62D 1/00* (2006.01)
*B62D 1/19* (2006.01)
*B60R 13/02* (2006.01)

(52) U.S. Cl.
CPC .......... *B62D 1/195* (2013.01); *B60R 13/0256* (2013.01); *B60K 2370/782* (2019.05)

(58) Field of Classification Search
CPC .... B62D 21/195; B62D 1/00; B60R 13/0256; B60K 2370/782
(Continued)

(56) References Cited

U.S. PATENT DOCUMENTS

| 8,939,493 | B1* | 1/2015 | Barthlow | ............ B60R 13/0256 |
| | | | | 296/70 |
| 2004/0129098 | A1* | 7/2004 | Gayer | .................... B62D 1/187 |
| | | | | 74/18 |

(Continued)

FOREIGN PATENT DOCUMENTS

| JP | 60064136 U | 5/1985 |
| JP | 60-161670 U | 10/1985 |

(Continued)

OTHER PUBLICATIONS

Translation of JP-2011235707-A accessed at espacenet.com on Jun. 16, 2020. (Year: 2011).*

*Primary Examiner* — James A Shriver, II
*Assistant Examiner* — Hilary L Johns
(74) *Attorney, Agent, or Firm* — Sughrue Mion, PLLC (57) ABSTRACT

A gap concealing structure for a vehicle includes an instrument cluster frame, a steering column, a steering column cover, and a flexible concealing member that conceals the gap between the instrument cluster frame and the steering column cover in the front-rear direction of the vehicle. The instrument cluster frame includes a curvilinear recess that is recessed upward away from the steering column and an attachment wall that extends in the up-down direction and the left-right direction of the vehicle from the lower surface of the recess. The concealing member has a first end and a second end in the front-rear direction of the vehicle. The first end of the concealing member is attached to the attachment wall of the instrument cluster frame. The second end of the concealing member is attached to the steering column cover.

6 Claims, 5 Drawing Sheets

(58) Field of Classification Search
USPC .......................................................... 280/780
See application file for complete search history.

(56) References Cited

U.S. PATENT DOCUMENTS

| | | | |
|---|---|---|---|
| 2006/0214461 A1* | 9/2006 | Kornylo | B62D 65/14 296/70 |
| 2009/0033083 A1* | 2/2009 | Kobayashi | B62D 1/187 280/779 |
| 2013/0291478 A1* | 11/2013 | Fabris | B60R 13/0256 52/716.5 |
| 2013/0334835 A1* | 12/2013 | Clark | B60R 21/045 296/72 |
| 2016/0355145 A1* | 12/2016 | Forth | B60W 30/18 |
| 2017/0253263 A1* | 9/2017 | Iyanagi | B62D 1/187 |

FOREIGN PATENT DOCUMENTS

| | | | |
|---|---|---|---|
| JP | 2008-254480 A | | 10/2008 |
| JP | 2011-057004 A | | 3/2011 |
| JP | 2011235707 A | * | 11/2011 |
| JP | 2011235707 A | | 11/2011 |

* cited by examiner

GAP CONCEALING STRUCTURE FOR VEHICLE

BACKGROUND

The present disclosure relates to a gap concealing structure for a vehicle that includes a concealing member concealing the gap between the instrument cluster frame and the steering column cover.

A vehicle includes instrument gauges, an instrument cluster frame surrounding the instrument gauges, a steering column, which is located below the instrument cluster frame and has an axis extending in the front-rear direction of the vehicle, and a steering column cover, which covers a section of the steering column that is located on the rear side of the instrument cluster frame in the front-rear direction. The instrument cluster frame has a lower structural portion located below the instrument gauges in the up-down direction of the vehicle. There is a gap between the lower structural portion of the instrument cluster frame and the steering column cover in the front-rear direction of the vehicle. The size of the gap changes when the position or the angle of the steering wheel attached to the steering column is adjusted. Thus, the gap between the lower structural portion of the instrument cluster frame and the steering column cover is concealed by a flexible concealing member. For example, in the gap concealing structure disclosed in Japanese Laid-Open Patent Publication No. 2011-57004, the concealing member has a linear attachment edge that is attached to the lower surface of the lower structural portion of the instrument cluster frame.

From the viewpoint of enhancing the aesthetic appearance, the lower structural portions of some instrument cluster frames are provided with a curvilinear recess that is recessed upward away from the steering column. In this case, the lower surface of the lower structural portion that configures the recess is a curved surface. The uppermost part in the vehicle up-down direction of the recess is defined as an upper end, and the lowermost parts are defined as lower ends. A straight line connecting the lower ends in the vehicle left-right direction of the recess is defined as an imaginary folding line. The distance between the upper end of the recess and the imaginary folding line is longer than the distance between each lower end of the recess and the imaginary folding line. That is, the distance between the recess and the imaginary folding line varies depending on the position in the left-right direction of the vehicle.

When the attachment edge of the concealing member disclosed in Japanese Laid-Open Patent Publication No. 2011-57004 is attached to the lower surface of the lower structural portion, which is a curved surface, the length of a portion of the concealing member between the upper end of the recess and the imaginary folding line is substantially the same as the length of the portion between each lower end of the recess and the imaginary folding line. Thus, the length of the portion of the concealing member between the upper end of the recess and the imaginary folding line is substantially the same as the distance between the upper end of the recess and the imaginary folding line, whereas the length of the portion between each lower end of the recess and the imaginary folding line is longer than the distance between each lower end of the recess and the imaginary folding line. Therefore, the portion of the concealing portion between each lower end of the recess and the imaginary folding line is more likely to bend than the portion between the upper end of the recess and the imaginary folding line. As a result, creases may occur in the concealing member.

SUMMARY

An objective of the present disclosure is to provide a gap concealing structure for a vehicle that suppresses the occurrence of creases in a concealing member.

In accordance with one aspect of the present disclosure, a gap concealing structure for a vehicle is provided. The gap concealing structure includes an instrument cluster frame, a steering column, a steering column cover, and a flexible concealing member. The instrument cluster frame is configured to surround a gauge. The steering column is located below the instrument cluster frame. An axial direction of the steering column extends in a front-rear direction of the vehicle. The steering column cover covers a section of the steering column that is located on a rear side in the front-rear direction of the instrument cluster frame. The flexible concealing member conceals a gap between the instrument cluster frame and the steering column cover in the front-rear direction. The instrument cluster frame includes a curvilinear recess that is recessed upward away from the steering column, and an attachment wall that extends in an up-down direction and a left-right direction of the vehicle from a lower surface of the recess. The concealing member has a first end and a second end in the front-rear direction. The first end of the concealing member is attached to the attachment wall of the instrument cluster frame. The second end of the concealing member is attached to the steering column cover.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A gap concealing structure for a vehicle according to an embodiment will now be described with reference to FIGS. 1 to 5. In the following description, the direction in which the driver of the vehicle faces in the forward direction of the vehicle is defined as a forward direction. The rearward, leftward, rightward, upward, and downward directions are defined with reference to the forward direction.

Figure 1:
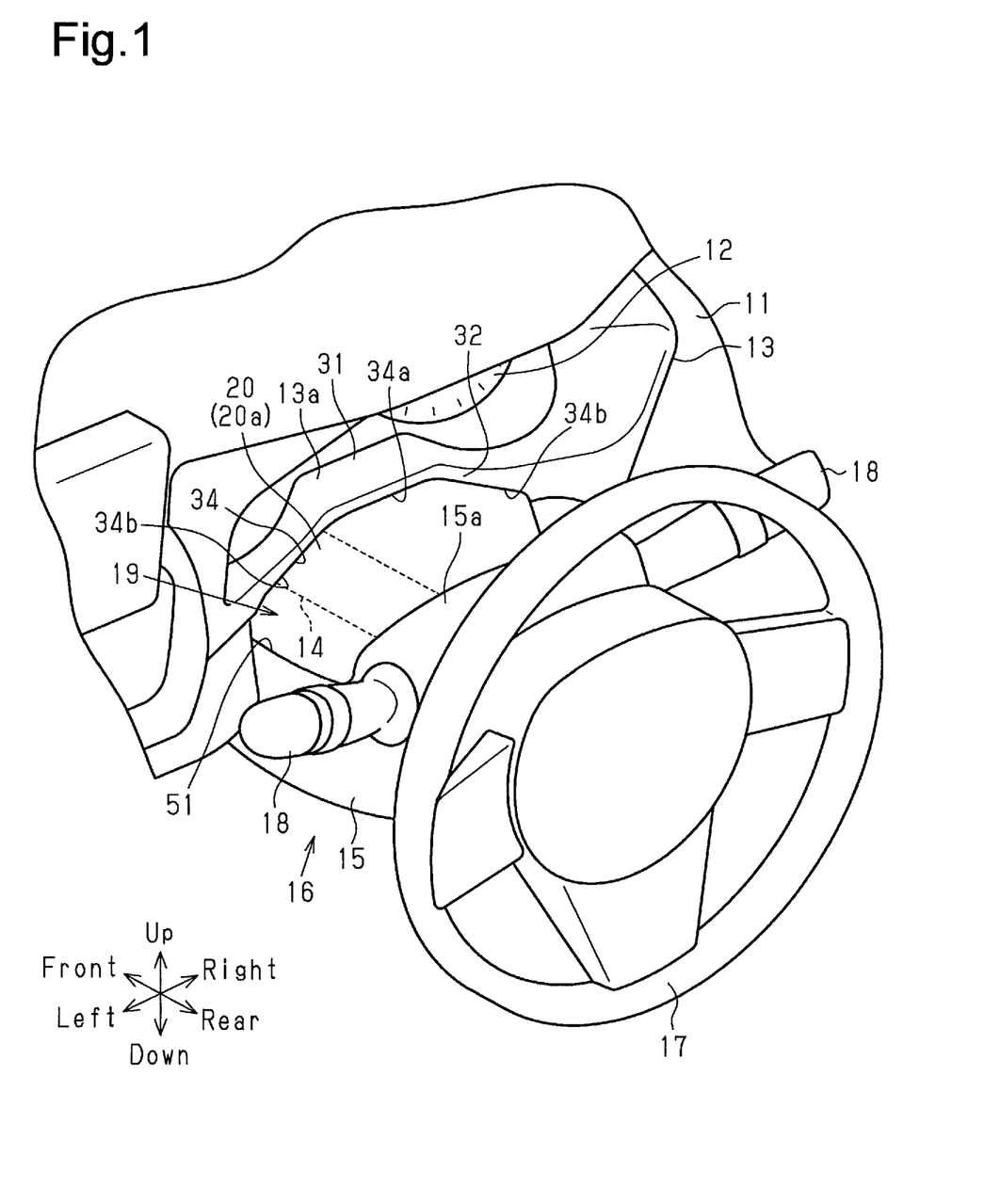
FIG. 1 is a perspective view of a gap concealing structure for a vehicle according to an embodiment.

As shown in FIG. 1, the vehicle includes an instrument panel 11 provided in the front of the passenger compartment, a gauge 12 fixed to the upper part of the instrument panel 11 on the driver's seat side, and an instrument cluster frame 13, which surrounds the gauge 12 and is fixed to the instrument panel 11. The gauge 12 is, for example, a speedometer or a tachometer.

Figure 2:
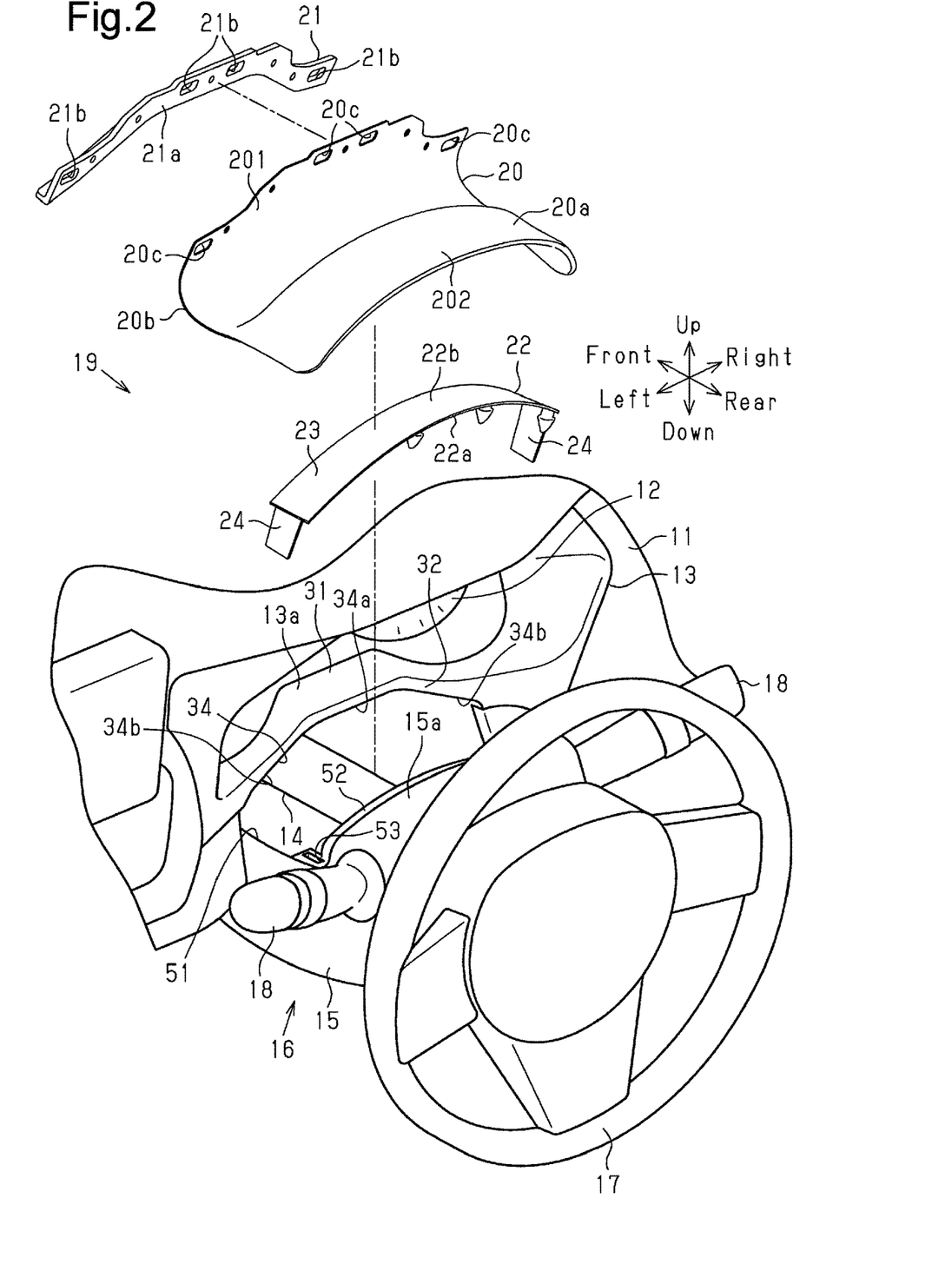
FIG. 2 is an exploded perspective view of the gap concealing structure for a vehicle of FIG. 1.
Figure 3:
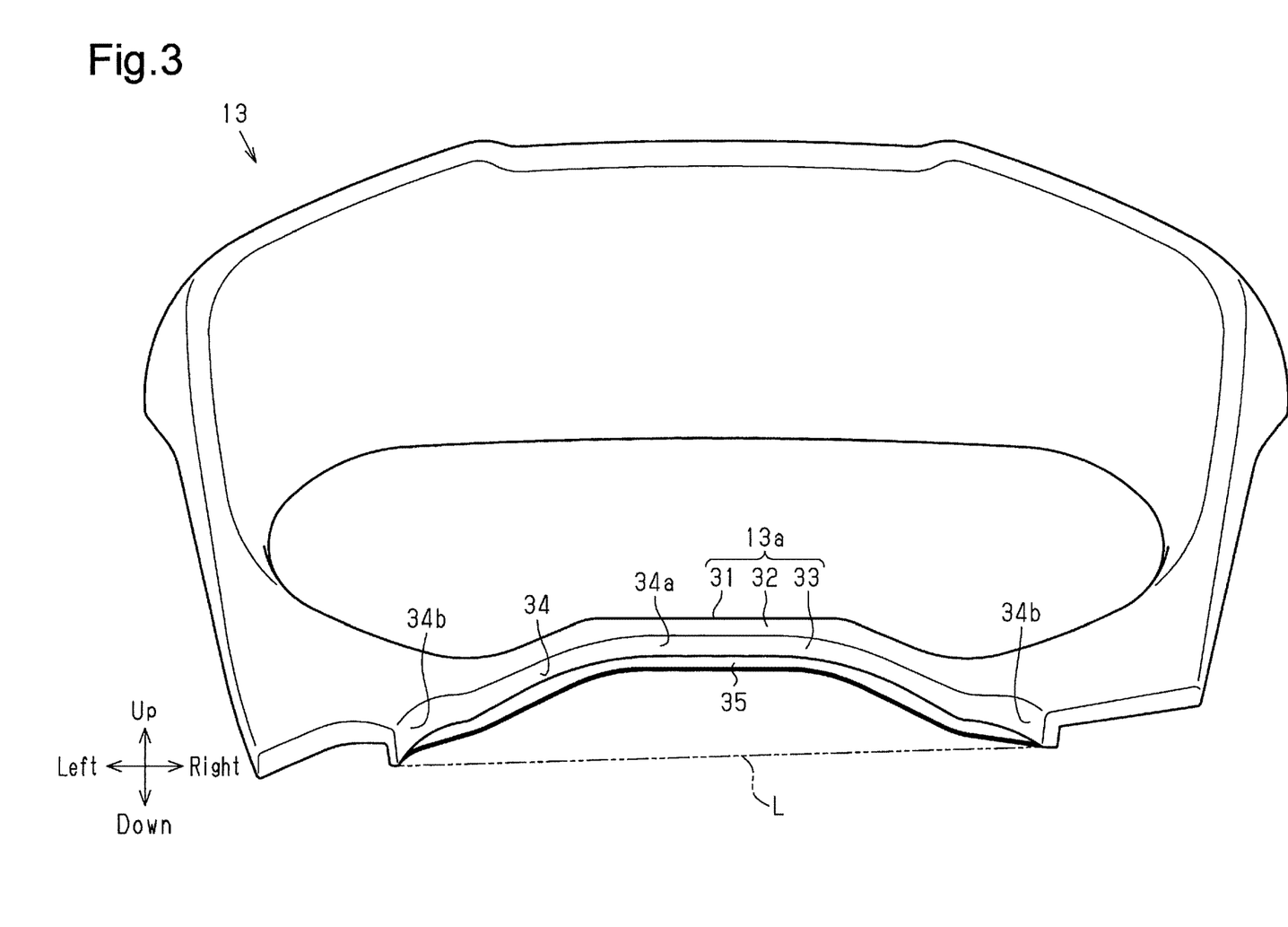
FIG. 3 is a perspective view of the instrument cluster frame.

As shown in FIGS. 1 and 2, the instrument cluster frame 13 has a lower structural portion 13a located below the gauge 12. The lower structural portion 13a has an elongated shape extending in the left-right direction of the vehicle, that is, in the lateral direction of the vehicle. As shown in FIG. 3, the lower structural portion 13a has an upper surface 31, a front surface 32, and a lower surface 33. The upper surface 31 extends in the left-right direction of the vehicle, that is, in the lateral direction of the vehicle, and extends in the front-rear direction of the vehicle. The front-rear direction of the upper surface 31 is the left-right direction of the vehicle, and the transverse direction of the upper surface 31 is the front-rear direction of the vehicle. The front surface 32 extends downward in the up-down direction of the vehicle from the rear edge of the upper surface 31 in the front-rear direction of the vehicle. The lower surface 33 extends forward in the front-rear direction of the vehicle from the lower edge of the front surface 32 in the up-down direction of the vehicle.

The vehicle includes a steering column 14 arranged below the instrument cluster frame 13 and a substantially cylindrical steering column cover 15 covering a section of the steering column 14 located on the rear side of the instrument cluster frame 13. The steering column 14 and the steering column cover 15 constitute a steering column unit 16.

The steering column 14 has an axial direction extending in the front-rear direction and is inclined such that the rear end in the axial direction is located above the front end in the up-down direction. The front end in the axial direction of the steering column 14 is inserted into the instrument panel 11. A steering wheel 17 is attached to the rear end in the axial direction of the steering column 14.

As shown in FIGS. 1 and 2, the steering column cover 15 is located between the instrument cluster frame 13 and the steering wheel 17 in the front-rear direction. The steering column cover 15 has an upper structural portion 15a located above the steering column 14. The upper structural portion 15a has a column-side recess 51 recessed from the front side toward the rear side in the front-rear direction. As shown in FIG. 2, the steering column cover 15 has an attachment portion 52 at the rear end of the column-side recess 51. The attachment portion 52 constitutes the bottom surface of the column-side recess 51 and extends in the left-right direction. The attachment portion 52 has a curved shape that is convex bulging upward in the up-down direction. The attachment portion 52 has tab insertion holes 53 (only one of them is shown in FIG. 2) at the opposite ends in the left-right direction. The steering column cover 15 has a storage portion (not shown) on the rear aide of the column-side recess 51. The storage portion stores a part of a combination switch 18, for example.

As shown in FIGS. 2 and 3, the instrument cluster frame 13 has a gauge-side recess 34 in the lower structural portion 13a. The gauge-side recess 34 is recessed upward away from the steering column 14. The gauge-side recess 34 is a curvilinear recess recessed toward the gauge 12 when viewed in the front-rear direction. Thus, the portion of the lower surface 33 that constitutes the gauge-side recess 34 is a curved surface. The uppermost part of the gauge-side recess 34 in the up-down direction is defined as an upper end 34a, and the lowermost parts are defined as lower ends 34b. In the present embodiment, the upper end 34a is located in the middle in the left-right direction, and the lower ends 34b are located on the opposite sides in the left-right direction. The gauge-side recess 34 has a bilaterally symmetrical shape. A straight line connecting the lower ends 34b in the vehicle left-right direction is defined as an imaginary folding line L. The distance between the upper end 34a of the gauge-side recess 34 and the imaginary folding line L is longer than the distance between each lower end 34b of the gauge-side recess 34 and the imaginary folding line L. In the present embodiment, the distance between gauge-side recess 34 and imaginary folding line L decreases from the upper end 34a to each lower end 34b. That is, the distance between the gauge-side recess 34 and the imaginary folding line L varies depending on the position in the left-right direction.

Figure 4:
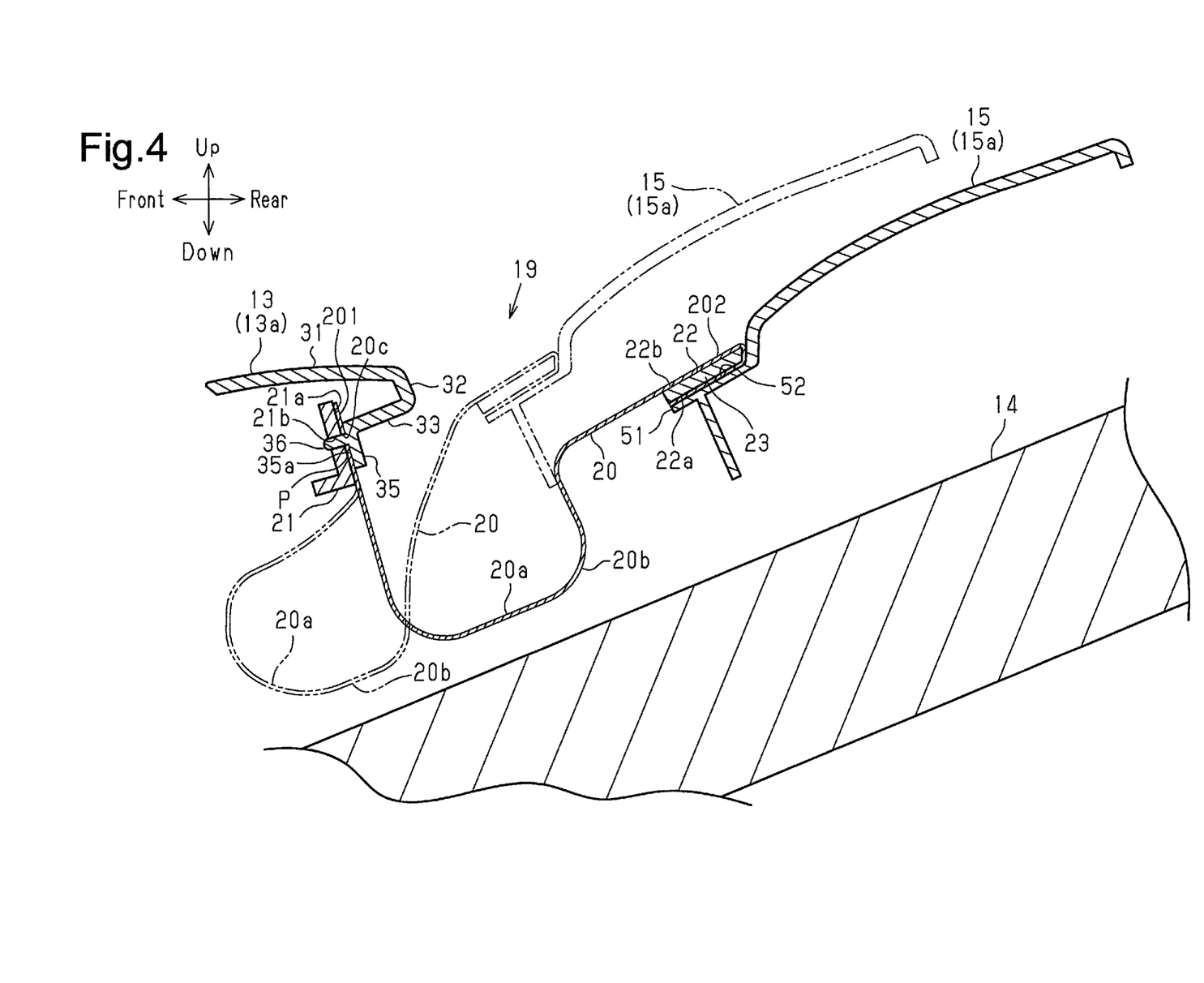
FIG. 4 is a cross-sectional of the gap concealing structure for a vehicle of FIG. 1.
Figure 5:
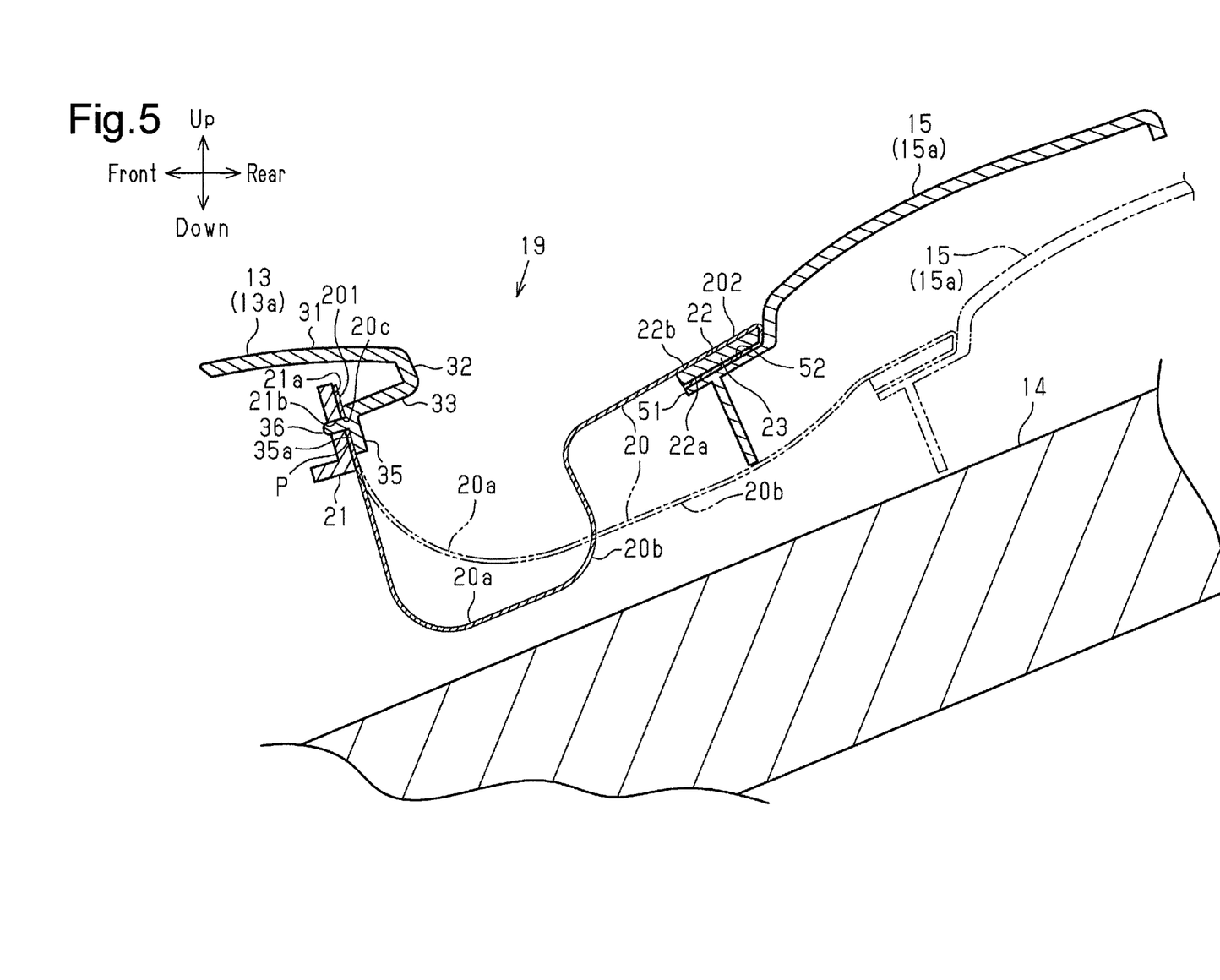
FIG. 5 is a cross-sectional view of the gap concealing structure for a vehicle of FIG. 1.

As shown in FIGS. 3 to 5, the instrument cluster frame 13 has an attachment wall 35 that extends in the up-down direction and the left-right direction of the vehicle from the portion of the lower surface 33 that constitutes the gauge-side recess 34. In the present embodiment, the attachment wall 35 protrudes downward in the up-down direction from the entirety of the portion of the lower surface 33 that constitutes the gauge-side recess 34. The attachment wall 35 has a shape conforming to the shape of the gauge-side recess 34 when viewed in the axial direction of the steering column 14. That is, the attachment wall 35 has a curved shape that is recessed away from the steering column 14. The dimension of the attachment wall 35 in the up-down direction is substantially constant over the left-right direction. The front end face 35a of the attachment wall 35 is a flat surface. As shown in FIGS. 4 and 5, the attachment wall 35 has tabs 36 projecting forward from the front end face 35a.

The steering column unit 16 has a tilt mechanism for adjusting the position in the up-down direction (angle) of the steering wheel 17 and a telescopic mechanism for adjusting the position in the front-rear direction of the steering wheel 17. In FIGS. 4 and 5, the solid lines represent the instrument cluster frame 13 and the steering column cover 15 in a state in which the steering wheel 17 is located at the reference position in the up-down direction and the front-rear direction. In the axial direction of the steering column 14, a gap exists between the lower structural portion 13a of the instrument cluster frame 13 and the upper structural portion 15a of the steering column cover 15.

In FIG. 4, the long dashed double-short dashed lines represent the instrument cluster frame 13 and the steering column cover 15 in a state in which the steering wheel 17 is adjusted to be above the reference position in the up-down direction and on the front side of the reference position in the front-rear direction by the tilt mechanism and the telescopic mechanism. At this time, the gap between the lower structural portion 13a of the instrument cluster frame 13 and the upper structural portion 15a of the steering column cover 15 is minimized in the axial direction of the steering column 14.

In FIG. 5, the long dashed double-short dashed lines represent the instrument cluster frame 13 and the steering column cover 15 in a state in which the steering wheel 17 is adjusted to be below the reference position in the up-down direction and on the rear side of the reference position in the front-rear direction by the tilt mechanism and the telescopic mechanism. At this time, the gap between the lower structural portion 13a of the instrument cluster frame 13 and the upper structural portion 15a of the steering column cover 15 is maximized in the axial direction of the steering column 14. That is, the gap between the lower structural portion 13a of the instrument cluster frame 13 and the upper structural portion 15a of the steering column cover 15 changes in accordance with the adjustment of the steering wheel 17 by the tilt mechanism and the telescopic mechanism of the steering column unit 16.

As shown in FIGS. 1 and 2, the vehicle has a gap concealing structure 19, which conceals the gap between the instrument cluster frame 13 and the steering column cover 15. The gap concealing structure 19 includes a concealing member 20, which covers and conceals the gap between the lower structural portion 13a of the instrument cluster frame 13 and the upper structural portion 15a of the steering column cover 15. The concealing member 20 is flexible. The concealing member 20 of the present embodiment is made of artificial leather. In the concealing member 20, the surface exposed to the passenger compartment is defined as a front face 20a, and the surface facing the steering column 14 is defined as a back face 20b.

The dimension in the front-rear direction of the concealing member 20 is greater than the maximum distance between the lower structural portion 13a of the instrument cluster frame 13 and the upper structural portion 15a of the steering column cover 15. Also, the dimension of the concealing member 20 in the left-right direction is substantially the same as the dimension in the left-right direction of the column-side recess 51. The concealing member 20 has tab insertion holes 20c at a first end 201 in the front-rear direction. The tab insertion holes 20c extend through the concealing member 20 in the thickness direction. The edge along the left-right direction at the first end 201 in the front-rear direction of the concealing member 20 has a non-linear shape in which the central portion in the left-right direction protrudes further than the opposite ends. As shown in FIGS. 4 and 5, the first end 201 in the front-rear direction of the concealing member 20 is attached to the attachment wall 35 of the instrument cluster frame 13, and a second end 202 in the front-rear direction of the concealing member 20 is attached to the attachment portion 52 of the steering column cover 15.

As shown in FIG. 2, the gap concealing structure 19 includes an elongated plate-shaped first retainer 21 and a thin plate-shaped second retainer 22. The first retainer 21, together with the attachment wall 35 of the instrument cluster frame 13, holds the first end 201 in the front-rear direction of the concealing member 20. The second retainer 22, together with the attachment portion 52 of the steering column cover 15, holds the second end 202 in the front-rear direction of the concealing member 20.

The longitudinal direction of the first retainer 21 coincides with the left-right direction, and the transverse direction of the first retainer 21 coincides with the up-down direction. The first retainer 21 has a shape that conforms to the attachment wall 35 of the instrument cluster frame 13 when viewed in the front-rear direction. That is, the first retainer 21 has a curved shape that is recessed away from the steering column 14. The first retainer 21 has a flat rear end face 21a. The first retainer 21 has tab insertion holes 21b extending in the thickness direction of the first retainer 21.

The second retainer 22 includes a rectangular plate-shaped base 23. The base 23 has a shape that conforms to the attachment portion 52 of the steering column cover 15. That is, the base 23 has a curved shape that is convex bulging upward in the up-down direction. The longitudinal direction of the base 23 coincides with the left-right direction, and the transverse direction of the base 23 coincides with the front-rear direction. The second retainer 22 has tabs 24 protruding from the lower surface 22a of the base 23 on at the opposite ends in the left-right direction.

Next, a state in which the concealing member 20 is attached to the instrument cluster frame 13 and the steering column cover 15 will be described. In the present embodiment, the concealing member 20 is attached to the instrument cluster frame 13 and the steering column cover 15 after being integrated with the first retainer 21 and the second retainer 22.

As shown in FIGS. 4 and 5, the back face 20b of the first end 201 in the front-rear direction of the concealing member 20 is the front end face located on the front side of the front face 20a, and the front face 20a is the rear end face. The first end 201 in the front-rear direction of the concealing member 20 is held between the front end face 35a of the attachment wall 35 of the instrument cluster frame 13 and the rear end face 21a of the first retainer 21. The back face 20b of the first end 201 in the front-rear direction of the concealing member 20 is attached to the rear end face 21a of the first retainer 21 by a double-sided tape (not shown). The front face 20a of the first end 201 in the front-rear direction of the concealing member 20 is attached to the front end face 35a of the attachment wall 35 of the instrument cluster frame 13. Thus, the front face 20a of the concealing member 20 has an attachment surface P facing the front end face 35a of the attachment wall 35. The attachment surface P has a shape conforming to the attachment wall 35 of the instrument cluster frame 13 when viewed in the axial direction of the steering column 14. That is, the attachment surface P has a curved shape that is recessed away from the steering column 14. In addition, the tabs 36, which protrude from the attachment wall 35 of the instrument cluster frame 13, penetrate through the tab insertion holes 20c of the concealing member 20 and the tab insertion holes 21b of the first retainer 21.

The second end 202 in the front-rear direction of the concealing member 20 covers an upper surface 22b of the second retainer 22 from the front side toward the rear side and covers the lower surface 22a of the second retainer 22 from the rear side toward the front side. That is, the second retainer 22 is wrapped with the second end 202 of the concealing member 20. The second end 202 in the front-rear direction of the concealing member 20 is held between the attachment portion 52 of the steering column cover 15 and the lower surface 22a of the second retainer 22. The back face 20b of the first end 201 in the front-rear direction of the concealing member 20 is bonded to the upper surface 22b and the lower surface 22a of the second retainer 22 with double-sided tapes (not shown). The front face 20a of the second end 202 in the front-rear direction of the concealing member 20 faces the attachment portion 52 of the steering column cover 15. Also, although not illustrated, the tabs 24 of the second retainer 22 are respectively inserted into the tab insertion holes 53 of the attachment portion 52 of the steering column cover 15.

When the gap between the lower structural portion 13a of the instrument cluster frame 13 and the upper structural portion 15a of the steering column cover 15 is small as indicated by the long dashed double-short dashed lines in FIG. 4, the bending amount in the front-rear direction of the concealing member 20 is great. Also, when the gap between the lower structural portion 13a of the instrument cluster frame 13 and the upper structural portion 15a of the steering column cover 15 is large as indicated by the long dashed double-short dashed lines in FIG. 5, the bending amount in the front-rear direction of the concealing member 20 is small. The gap between the lower structural portion 13a of the instrument cluster frame 13 and the upper structural portion 15a of the steering column cover 15 is always concealed by changing the bending of the concealing member 20.

Advantages of the present embodiment will be described together with its operation.

(1) The instrument cluster frame 13 is provided with the curvilinear gauge-side recess 34, which is recessed upward away from the steering column 14. The distance between the upper end 34a of the gauge-side recess 34 and the imaginary folding line L is longer than the distance between each lower end 34b of the gauge-side recess 34 and the imaginary folding line L. The instrument cluster frame 13 has the attachment wall 35, which protrudes downward from a portion of the lower surface 33 that constitutes the gauge-side recess 34. The front face 20a of the first end 201 in the front-rear direction of the concealing member 20 is attached to the instrument cluster frame 13 to face the front end face 35a of the attachment wall 35. The length of the portion of the concealing member 20 that is arranged between the upper end 34a of the gauge-side recess 34 and the imaginary folding line L is greater than the length of the portion arranged between the lower end 34b of the gauge-side recess 34 and the imaginary folding line L. Therefore, the length of the portion of the concealing member 20 that is arranged between the upper end 34a of the gauge-side recess 34 and the imaginary folding line L is substantially the same as the distance between the upper end 34a of the gauge-side recess 34 and the imaginary folding line L. Also, the length of the portion of the concealing member 20 that is arranged between the lower end 34b of the gauge-side recess 34 and the imaginary folding line L is substantially the same as the distance between the lower end 34b of the gauge-side recess 34 and the imaginary folding line L. That is, the concealing member 20 is allowed to be installed in accordance with the distance between the gauge-side recess 34 and imaginary folding line L. This suppresses the generation of creases in the concealing member 20.

(2) The first end 201 in the front-rear direction of the concealing member 20 is held between the front end face 35a of the attachment wall 35 of the instrument cluster frame 13 and the rear end face 21a of the first retainer 21. Therefore, as compared to a configuration without the first retainer 21, the attachment of the concealing member 20 to the attachment wall 35 of the instrument cluster frame 13 is strengthened.

Further, the second end 202 in the front-rear direction of the concealing member 20 is held between the attachment portion 52 of the steering column cover 15 and the lower surface 22a of the second retainer 22. Therefore, as compared to a configuration without the second retainer 22, the attachment of the concealing member 20 to the attachment portion 52 of the steering column cover 15 is strengthened.

(3) The attachment wall 35 protrudes downward from the entirety of the portion of the lower surface 33 that constitutes the gauge-side recess 34. Thus, as compared with a case in which the attachment wall 35 protrudes downward from a part of the portion of the lower surface 33 that constitutes the gauge-side recess 34, the mounting area of the concealing member 20 with respect to the instrument cluster frame 13 is increased. Therefore, the attachment of the concealing member 20 to the instrument cluster frame 13 is strengthened.

The above-described embodiment may be modified as follows.

The gauge-side recess 34 does not necessarily need to have a smooth curvilinear shape. The gauge-side recess 34 may be configured by connected straight lines, for example.

The attachment wall 35 may protrude upward or protrude upward and downward in the up-down direction from the portion of the lower surface that constitutes the gauge-side recess 34. Even in this case, the attachment wall 35 has a front end face 35a to which the front face 20a of the first end 201 in the front-rear direction of the concealing member 20 is attached.

If the first end 201 in the front-rear direction of the concealing member 20 is attached to the attachment wall 35 of the instrument cluster frame 13, the front face 20a, which is the rear end face of the first end 201, and the front end face 35a of the attachment wall 35 do not need to face each other.

For example, the concealing member 20 may be attached to the instrument cluster frame 13 such that the back face 20b, which is the front end face of the first end 201 in the front-rear direction, faces the rear end face of the attachment wall 35. Further, for example, the first end 201 in the front-rear direction of the concealing member 20 may be attached to the attachment wall 35, while being folded such that the front face 20a is arranged on the inner side. In this case, the concealing member 20 is attached to the instrument cluster frame 13 such that the front face 20a, which is the front end face in the folded portion, faces the rear end face of the attachment wall 35, which protrudes upward from the lower surface 33.

Although the front end face 35a of the attachment wall 35 is preferably a flat surface, the front end face 35a may be curved.

The method of attaching the concealing member 20 to the attachment wall 35 of the instrument cluster frame 13 may be a method other than inserting the tabs 36 into the tab insertion hole 20c.

The method of attaching the second retainer 22 to the attachment portion 52 of the steering column cover 15 may be a method other than inserting the tabs 24 into the tab insertion hole 53.

The first retainer 21 may be omitted.

The second retainer 22 may be omitted.

The concealing member 20 and the first retainer 21 may be integrated by a method other than bonding with double-sided tape, for example, by welding. Likewise, the concealing member 20 and the second retainer 22 may be integrated by a method other than bonding with double-sided tape, for example, by welding.

The second end 202 in the front-rear direction of the concealing member 20 may be bonded to the lower surface 22a of the second retainer 22.

The edge along the left-right direction at the first end 201 in the front-rear direction of the concealing member 20 may be straight.

The attachment wall 35 may protrude downward from a part of the portion of the lower surface 33 that constitutes the gauge-side recess 34.

Therefore, the present examples and embodiments are to be considered as illustrative and not restrictive and the disclosure is not to be limited to the examples and embodiments given herein.

The invention claimed is:

1. A gap concealing structure for a vehicle, comprising:
   an instrument cluster frame configured to surround a gauge;
   a steering column located below the instrument cluster frame, an axial direction of the steering column extending in a front-rear direction of the vehicle;
   a steering column cover covering a section of the steering column that is located on a rear side in the front-rear direction of the instrument cluster frame; and
   a flexible concealing member that conceals a gap between the instrument cluster frame and the steering column cover in the front-rear direction, wherein
   the instrument cluster frame includes
      a curvilinear recess that is recessed upward away from the steering column, the recess having an upper end and two lower ends on opposite sides of the upper end, and an attachment wall that extends in an up-down direction and a left-right direction of the vehicle from a lower surface of the recess, the concealing member has a shape of a sheet and has a front end and a rear end in the front-rear direction, the front end of the concealing member is attached to the attachment wall of the instrument cluster frame such that the front end of the concealing member extends parallel to a surface of the attachment wall, defined by the recess, and an imaginary straight line connecting the two lower ends of the recess, the rear end of the concealing member is attached to the steering column cover, and a length of a portion of the concealing member that is arranged between the upper end of the recess and the imaginary straight line is greater than a length of a portion arranged between the two lower ends of the recess and the imaginary straight line.

2. The gap concealing structure for a vehicle according to claim 1, further comprising a plate-shaped retainer, wherein the front end in the front-rear direction of the concealing member is held between a front end face of the attachment wall and a rear end face of the retainer.

3. The gap concealing structure for a vehicle according to claim 1 or 2, wherein the attachment wall protrudes downward from an entirety of the lower surface of the recess.

4. The gap concealing structure for a vehicle according to claim 1, further comprising a plate-shaped retainer, wherein the steering column cover includes a plate-shaped attachment portion, and the rear end of the concealing member is held between one end face of the attachment portion of the steering column cover and one end face of the retainer.

5. The gap concealing structure for a vehicle according to any one of claims 1 to 4, wherein the front end face of the attachment wall is a flat surface.

6. The gap concealing structure for a vehicle according to claim 2, wherein the front end of the concealing member has a rear end face, the rear end face of the front end has an attachment surface facing the front end face of the attachment wall, and the attachment surface has a shape conforming to the recess.

* * * * *